United States Patent

[11] 3,558,930

| [72] | Inventors | James H. Knapton;<br>Henry A. Zimmerman, Beaverton, Oreg. |
|------|-----------|---|
| [21] | Appl. No. | 713,452 |
| [22] | Filed | Mar. 15, 1968 |
| [45] | Patented | Jan. 26, 1971 |
| [73] | Assignee | Tektronix, Inc.<br>Beaverton, Oreg.<br>a corporation of Oregon |

[54] JITTER-FREE TRIGGERING METHOD AND APPARATUS
13 Claims, 3 Drawing Figs.

[52] U.S. Cl. .................................................... 307/286,
307/217, 307/228, 307/293, 328/181
[51] Int. Cl. ........................................................ H03k 3/315
[50] Field of Search........................................... 307/217,
228, 286; 328/181, 182, 183, 184, 185

[56] References Cited
UNITED STATES PATENTS

| 3,215,948 | 11/1965 | Dalton........................ | 328/181X |
| 3,339,088 | 8/1967 | Dillard ........................ | 307/228X |
| 3,344,285 | 9/1967 | Frye............................. | 307/228 |
| 3,358,159 | 12/1967 | Smith........................... | 307/228 |
| 3,350,576 | 10/1967 | Zimmerman................. | 307/273X |

Primary Examiner—John S. Heyman
Attorney—Buckhorn, Blore, Klarquist and Sparkman ABSTRACT: In a system for triggering an oscilloscope, an input-triggering signal is detected at the conclusion of a holdoff signal, the latter having a duration as long as the time required by the circuit to recover from triggered operation. In response to such detection, a triggerable condition for the circuit is established. The input-triggering signal is also delayed and applied for initiating another operation after such triggerable condition has been established. In this manner, a jitter which might otherwise be occasioned at the end of a holdoff period is avoided.

JITTER-FREE TRIGGERING METHOD AND APPARATUS

BACKGROUND OF THE INVENTION

In an oscilloscope device for portraying a repetitive waveform, the term "jitter" refers to the movement of the portrayed waveform as triggering of horizontal deflection or the like is inaccurately accomplished. In many oscilloscope devices, for example, a triggering signal is derived from the repetitive input waveform for application to the device's sweep generator. This triggering signal causes the sweep generator to produce the horizontal time base, e.g., the movement of an electron beam from the left side to the right side of a cathode-ray tube screen. The horizontal sweep is successively triggered in a correct relation to each repetition of an input waveform such that the portrayed waveform appears in substantially the same place on a cathode-ray tube screen for each successive trace. However, if the sweep generator does not initiate its sweep output for application to the horizontal deflection plates in accurately timed relation with successive triggering signals, jitter or movement of the portrayed waveform is likely to result.

After each sweep waveform is generated by a sweep generator, the sweep generator must recover before another sweep waveform is generated. For this purpose, the horizontal sweep system is appropriately provided with a holdoff circuit which disables the sweep generator until the latter is capable of providing an accurate sweep waveform. A holdoff signal is produced by the holdoff circuit and is used to inhibit the sweep generator. Both the holdoff signal and triggering signals may be applied to the sweep generator in an opposing sense. Then, when the holdoff voltage declines sufficiently, triggering signals may again initiate a horizontal sweep.

A principal source of jitter occurs when a triggering signal is received when the holdoff has almost, but not quite, recovered. As a result, the triggering signal may or may not cause the production of a sweep output at a desired time. Furthermore, since both the holdoff signal and the triggering signal are effectively applied as inputs to a sweep generator, different portions of a triggering signal may cause the initiation of a sweep output depending upon the actual value of the holdoff signal that may be present at the time triggering is accomplished.

SUMMARY OF THE INVENTION

In accordance with the present invention, an input-triggering signal is detected at the conclusion of a holdoff signal. In response to such detection, a triggerable condition is established for operation of a circuit such as a sweep generator or other triggerable device. This triggerable condition is allowed to stabilize before triggering is actually accomplished, and triggering is, as a result, not subject to the vagaries of operation frequently encountered at the holdoff conclusion. Then, a delayed triggering signal, being a delayed version of the same triggering signal employed to establish the aforementioned triggerable condition, is applied for triggering the device.

In a preferred embodiment of the present invention, first means for detecting an input-triggering level at the conclusion of a holdoff signal comprises a first tunnel diode which is armed at the conclusion of a holdoff signal. This first tunnel diode is triggered by an input-triggering signal to its high voltage state and is employed for arming a second tunnel diode. The same triggering signal is delayed through a delay means and applied to the second tunnel diode for triggering the latter to its high voltage state whereby such second tunnel diode provides an output. The tunnel diodes form fast operating bistable devices, and although these diodes are preferred according to the present invention because of their speed of response, other bistable devices such as triggerable multivibrators or the like may in some instances be suitably substituted therefore.

It is accordingly an object of the present invention to provide substantially jitter-free triggering in an oscilloscope, pulse generator, or similar device.

It is another object of the present invention to provide an improved method and apparatus for triggering an oscilloscope or the like which is substantially independent of jitter occasioned by a conventional holdoff period.

It is a further object of the present invention to provide an improved triggering system for an oscilloscope or the like which rapidly responds automatically to a triggering signal to initiate a deflection or sampling operation in correctly timed relation with the triggering signal.

It is a further object of the present invention to provide an improved jitter-free triggering method and apparatus for an oscilloscope or the like wherein a triggerable means is stabilized before a signal is applied thereto for initiating an operation in the oscilloscope.

It is a further object of the present invention to provide an improved jitter-free triggering method and apparatus for an oscilloscope or the like incorporating a means for providing a holdoff signal for allowing circuit recovery.

The subject matter which we regard as our invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 3 is a waveform chart illustrating operation of the system diagrammed in FIG. 1.

DETAILED DESCRIPTION

Figure 1:
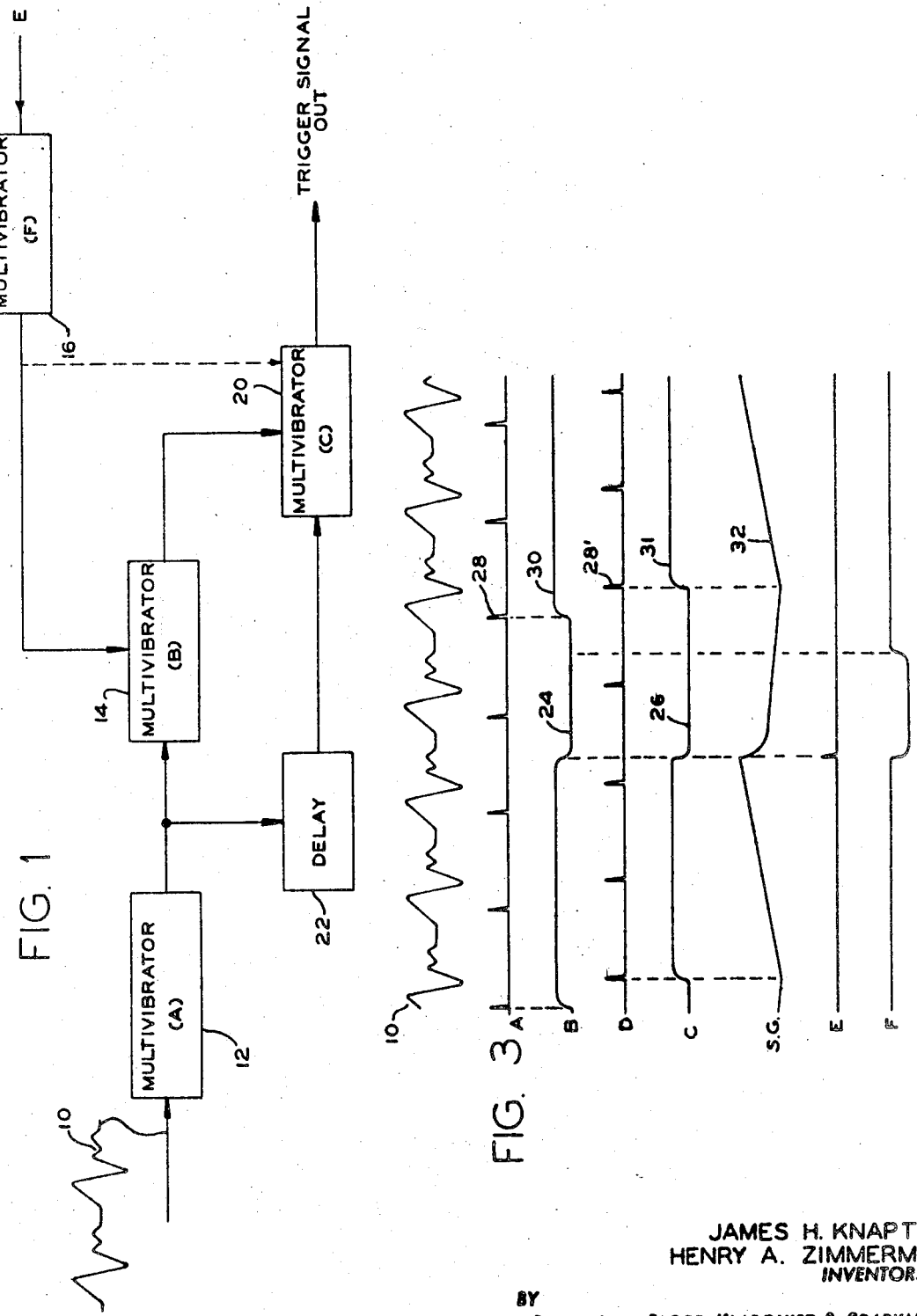
FIG. 1 is a block diagram of an improved triggering system in accordance with the present invention.

Referring to the block diagram of FIG. 1, the triggering signal 10 is applied as an input to first bistable circuit or multivibrator 12, also designated by the letter A. This multivibrator is employed as a trigger reshaper and produces an output-triggering signal of uniform waveform regardless of the shape of the input signal applied thereto. The output of circuit 12 is applied to bistable circuit or multivibrator 14, designated by the letter B, as well as to delay means 22. The output of multivibrator 12 triggers multivibrator 14 from one stable state to another, if prior to that time multivibrator 14 has been enabled by bistable circuit or multivibrator 16, designated with the letter F. Multivibrator 16 is operated by signal E, e.g. at the conclusion of a sweep waveform provided by a sweep generator, or at some other time, for preventing circuit operation during a predetermined holdoff period.

Multivibrator 14 detects an input-triggering signal at the conclusion of a holdoff signal. By this it is meant to indicate that triggering may suitably take place substantially coincident with or after the end of the holdoff signal, at which time multivibrator 14 is enabled. When enabled by multivibrator 16 and triggered by multivibrator 12, multivibrator 14 operates to establish a triggerable condition for bistable circuit or multivibrator 20, also designated by the letter C.

When a triggering input occurs, such triggering input is thus first shaped by multivibrator 12 and is employed to trigger multivibrator 14 if the latter has been enabled. Triggering of multivibrator 14 changes the stable state thereof for thereby establishing a triggerable condition for multivibrator 20. The delay of delay means 22 is arranged to be as long as the time required for establishing a stable triggerable condition for multivibrator 20 by multivibrator 14. The triggering signal as delayed by delay means 22 may then trigger multivibrator 20 from one stable state to another to provide a trigger signal output. This signal output may be applied to a horizontal sweep ramp generator, to a ramp generator for a sampling oscilloscope, or to some other triggerable circuit.

In the present circuit, multivibrator 16 acts as a holdoff circuit to provide an output for a predetermined period during which the circuit and/or the triggered device can recover from one triggered operation before another is initiated. Multivibrator 16 does not then enable multivibrator 14 until the conclusion of such holdoff period. However, any indefiniteness in operation of circuit 14 does not cause jitter in the output. This aspect of the system according to the present invention may more fully be understood by reference to the waveform chart of FIG. 3 wherein the initial input triggering signal is again indicated at 10 and wherein the shaped output of multivibrator 12 is indicated at A. The outputs of the other bistable circuits are similarly designated by letters corresponding to those employed on the block diagram. The output of delay means 22 is indicated at D, and the output of a sweep generator which may be operated by the trigger signal output is indicated by the letters S.G.

In the specific example of operation as indicated in FIG. 3, a signal, E, is provided at the end of an oscilloscope's horizontal sweep. This signal, E, produces the waveform F from multivibrator 16, comprising a holdoff signal, which continues for a holdoff period of sufficient time for allowing the circuitry to recover from a given sweep. When the holdoff signal occurs, multivibrator 14 is reset to provide an output level indicated at 24 in waveform B. The output of multivibrator 14 similarly resets multivibrator 20 (or multivibrator 16 directly resets multivibrator 20 as indicated by the dashed line in FIG. 1) to level 26 in waveform C. For the duration of the holdoff period, i.e., as long as holdoff signal F is present, multivibrators 14 and 20 are not receptive to triggering inputs. However, at the conclusion of waveform F, multivibrator 16 enables multivibrator 14 to be so receptive, and the next shaped triggering signal output from multivibrator 12, indicated at 28 on the waveform chart, causes multivibrator 14 to assume its second stable state designated at 30. The output of multivibrator 14 biases multivibrator 20 so that a triggerable condition for the latter is established. Pulse 28' as delayed in delay means 22, and indicated in waveform D, causes multivibrator 20 to assume its second stable state referred to at 31. The triggering of multivibrator 20 to its second stable state is suitably applied to a sweep generator for initiating a ramp waveform output 32. It should be noted that the triggerable or biased condition of circuit 20, whereby it is receptive to the delayed input triggering signal 28', is fully stabilized before the delayed triggering signal arrives, and no jitter attributable to the holdoff period is present in the sweep generator output, even though the operation of multivibrator 14 may be affected by holdoff jitter, as when multivibrator 14 is enabled just at the end of a holdoff period.

Although the bistable circuits are herein referred to and illustrated as multivibrators, it should be apparent that the concept of the present invention is not restricted to bistable, monostable, or multistable elements of a particular type. It is apparent that other specific circuit elements may be employed to accomplish the method of sweep triggering according to the present invention. Because of the speed of operation, tunnel diodes are preferred as bistable or multivibrator means as is further illustrated in connection with FIG. 2.

Although the foregoing example of operation is described in terms of triggering a horizontal sweep generator or the like, it should be noted that circuitry in accordance with the present invention may be as readily employed to provide a trigger signal output to some other device, such as the fast ramp generator and comparator circuit in a sampling type oscilloscope. Moreover, the period of operation of a holdoff circuit, such as here represented by multivibrator 16, may vary from one circuit to another. The holdoff period may be initiated during or at the conclusion of a ramp or sweep waveform, or substantially in response to operation of multivibrator 20, or at some other time. The holdoff interval may be begun and/or ended in accordance with a command, E, in FIG. 1. The holdoff period may be "programmed" so that it is in accordance with the operation that may be triggered by the circuit according to the present invention. For such alternative types of operation, the waveform, S.G., in FIG. 3 is ordinarily no longer applicable.

Figure 2:
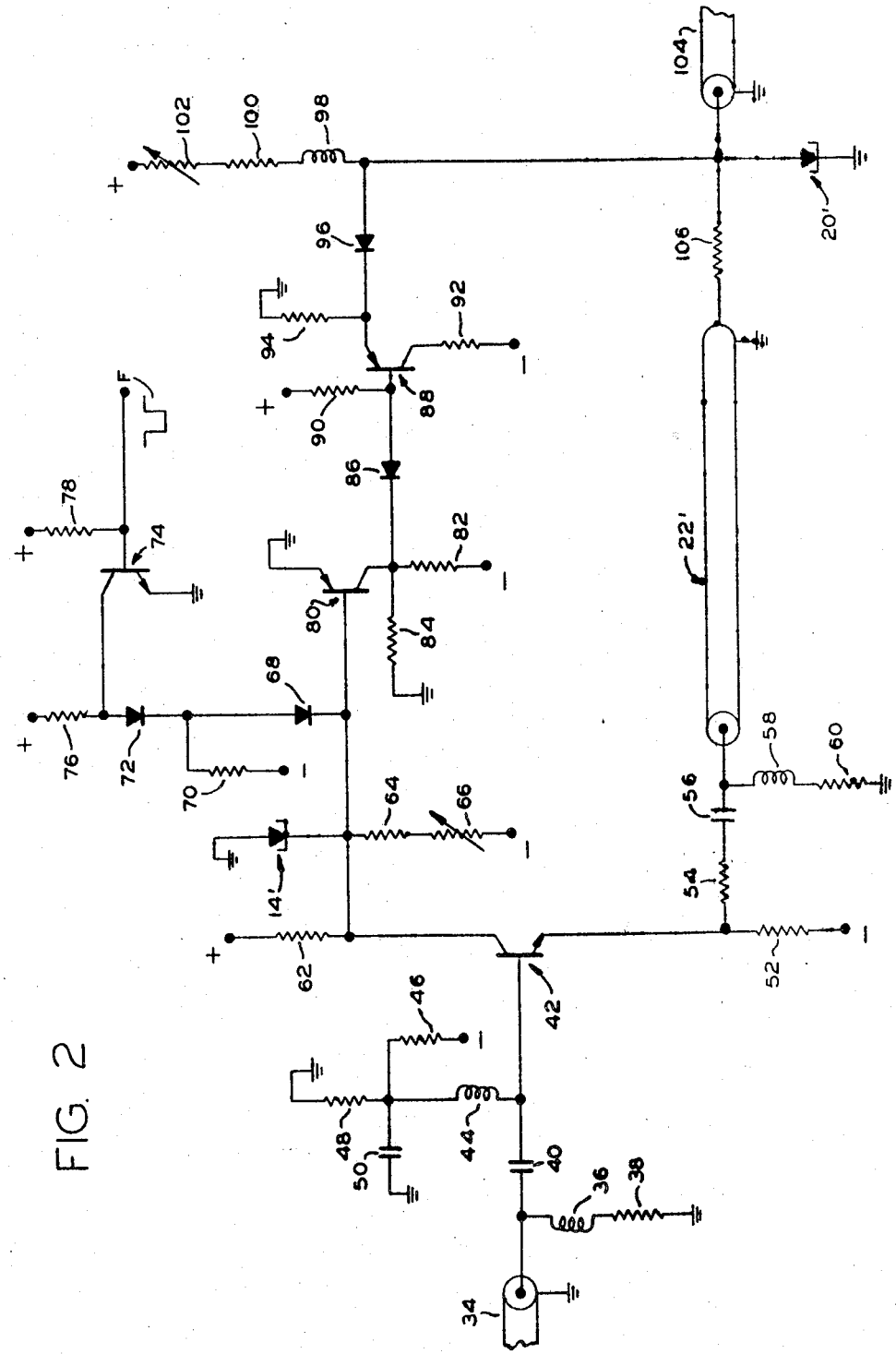
FIG. 2 is a schematic circuit diagram of principal portions of the improved triggering system according to the present invention.

Referring to FIG. 2, a circuit including principal portions of a system corresponding to the FIG. 1 block diagram is illustrated. A shaped triggering input is received via 50 ohm coaxial line 34 and is applied to a termination comprising an all-pass network, here presenting an impedance of approximately 50 ohms for matching the line. The termination includes inductance 36 in series with resistor 38 between the central conductor of the coaxial line and ground. A coupling capacitor 40 couples such central conductor to the base of transistor 42 while inductance 44 couples the base of transistor 42 to the midpoint of a voltage divider comprising resistors 46 and 48 connected in series between a negative voltage point and ground, for biasing the base of transistor 42. The voltage divider midpoint is bypassed to ground by capacitor 50.

The emitter of transistor 42 is returned to a negative voltage point through resistor 52 and is coupled through a terminating network including resistor 54 in series with capacitor 56 to the input end of delay line 22' which corresponds to the delay means 22 of FIG. 1. The central conductor at the input end of line 22' is also returned to ground through inductance 58 in series with resistor 60. Elements 54, 56, 58, and 60 form a termination for pulses which might be reflected back to the input end of delay line 22'. Delay line 22' may comprise a suitable length of coaxial cable for providing a desired delay as hereinafter more fully indicated. It may consist of a 50 ohm coaxial line.

The collector of transistor 42 is coupled to a positive voltage through load resistor 62 and to the cathode of tunnel diode 14', the anode of which is grounded. Tunnel diode 14' corresponds to the multivibrator indicated by reference numeral 14 in FIG. 1. The cathode of tunnel diode 14' is returned to a negative voltage through resistor 64 in series with variable resistor 66, and is also connected to the cathode of diode 68. The anode of diode 68 is connected to a negative voltage through resistor 70 and through similarly poled diode 72 to the collector of transistor 74, the latter being returned to positive voltage through load resistor 76. The emitter of transistor 74 is grounded, and a base resistor 78 is interposed between the base of transistor 74 and a positive voltage point. The base of transistor 74 receives a negative going holdoff signal, F.

The cathode of tunnel diode 14' is also connected to the base of a transistor 80 having its emitter grounded and its collector connected to the center point of a voltage divider comprising resistors 82 and 84 disposed in series between a negative voltage point and ground. The collector of transistor 80 is additionally connected to the cathode of a diode 86, the anode of which is coupled to the base of transistor 88. The base of transistor 88 is returned to a positive voltage through resistor 90. The collector of transistor 88 is coupled to a negative voltage through resistor 92, while the emitter of transistor 88 is connected to the cathode of a diode 96, as well as through resistor 94 to ground. The anode of diode 96 is coupled to one end of a series circuit including inductance 98, resistor 100, and variable resistor 102 interposed between the anode of diode 96 and a positive voltage point. The anode of diode 96 is further connected to the anode of a tunnel diode 20', this tunnel diode corresponding to the bistable circuit or multivibrator 20 in the FIG. 1 block diagram. The cathode of tunnel diode 20' is grounded.

The circuitry including transistors 80 and 88 forms a DC amplifier for coupling tunnel diode 14' to tunnel diode 20' so that tunnel diode 14' is effective to "arm" or to establish a triggerable condition for tunnel diode 20'. Tunnel diode 20' also receives a delayed input from the output end of delay line 22' through resistor 106, and provides a triggering input to a triggerable device (not shown in FIG. 2) through coaxial cable 104.

Considering the operation of the FIG. 2 circuit, and starting at a point in time just after the conclusion of a prior triggered operation, a holdoff signal F is applied for preventing the immediate initiation of another triggered operation. This holdoff signal here suitably comprises a negative, square, or rectangular wave which maintains transistor 74 in a cutoff condition. At this time, a current flows downwardly, in FIG. 2, from a positive source through resistor 76, diode 72, diode 68, resistor 64, and variable resistor 66 to a negative source. This current flow produces a voltage drop in resistors 64 and 66 such that tunnel diode 14' is reverse biased. At this time, therefore, tunnel diode 14' cannot respond to a triggering signal. Similarly, transistor 80 is biased to cutoff. At the same time, a current flows from a positive source through resistors 102 and 100, inductance 98, and diode 96 to the emitter of transistor 88, which transistor is in a conducting condition. The junction between the anode of diode 96 and inductance 98 is then at approximately ground level. Input triggering pulses at the emitter of transistor 42 and coupled to delay line 22' are of insufficient amplitude to trigger tunnel diode 20' to its high voltage state.

However, at the positive-going conclusion of waveform F, the collector of transistor 74 conducts current through resistor 76. The voltage at the collector of transistor 74 drops to near ground, and an additional voltage drop is provided by diode 72 such that diode 68 quickly ceases to conduct. Tunnel diode 14' which was theretofore biased off is now left in an armed condition. The next positive-going triggering input from coaxial line 34 produces a negative-going output at the collector of transistor 42 which is effective to trigger tunnel diode 14' from a low voltage state to a high voltage state. As a result, a negative pulse is delivered to the base of transistor 80 causing the collector thereof to go positive. Transistor 88 is connected in an emitter-follower configuration, and the positive-going excursion at the collector of transistor 80, as coupled through diode 86 to the base of transistor 88, causes the emitter of transistor 88 to go positive. The voltage drop in diode 86 insures that the emitter of transistor 88 will then be above ground level, and diode 96 is rapidly cut off. As a result, a predetermined arming current is delivered to tunnel diode 20' through elements 100, 102, and 98, for establishing a triggerable condition thereof. This current is advantageously just less than the current required to switch the tunnel diode from a low voltage state to a high voltage state. The circuit including elements 98, 100, and 102 is arranged to have sufficient impedance so that the current supplied is substantially constant and quickly stabilizes through tunnel diode 20'.

Meanwhile, the same triggering input as applied to transistor 42 produces a delayed triggering input at the output end of delay line 22'. The delay is arranged to be sufficient so that tunnel diode 20' is stably armed in a triggerable condition before the delayed triggering signal reaches tunnel diode 20' through resistor 106. When the delayed triggering signal reaches tunnel diode 20', the latter is accurately triggered to its high voltage state and provides a triggering output on line 104.

The delay of delay line 22' should preferably be just long enough for tunnel diode 20' to be stably armed. That is, it should be just slightly longer than the time required for the undelayed triggering signal to change the state of tunnel diode 14' and for the latter to provide a stable arming input to tunnel diode 20' by way of the DC amplifier comprising transistors 80 and 88. Therefore, any jitter involving the holdoff signal and occurring in the arming and triggering of tunnel diode 14' does not affect the operation of tunnel diode 20'. However, the time delay should not be greater than necessary because too great a time delay may cause faulty operation. Thus, two closely spaced triggering input signals may occur at a time so that the first does not trigger tunnel diode 14' (because of holdoff), but the first may be transmitted through delay line 22' and reach tunnel diode 20' after tunnel diode 14' has been triggered by the second triggering signal. Then the first triggering signal may incorrectly trigger the tunnel diode 20'. The likelihood of this kind of problem occurring is lessened by reducing the time delay of delay line 22' so that it is just slightly greater than the time required for stably arming tunnel diode 20' via transistor 42 and tunnel diode 14'. Alternatively the repetition period of multivibrator 12 (in FIG. 1) may be restricted so that it is shorter than the delay of delay means 22.

It will be appreciated that substantially at or after a triggered operation, a further holdoff pulse again biases tunnel diode 14' to its non-triggerable condition and withdraws current from tunnel diode 20' so the latter returns to a low voltage condition. Both tunnel diodes 14' and 20' are maintained in an unarmed condition for the duration of the holdoff signal.

While we have shown and described preferred embodiments of our invention, it will be apparent to those skilled in the art that many changes and modifications may be made without departing from our invention in its broader aspects. We therefore intend the appended claims to cover all such changes and modifications as fall within the true spirit and scope of our invention.

We claim:

1. A jitter-free method for triggering a triggerable device comprising:
    generating a holdoff signal for a predetermined period of time during which triggering is not desired;
    detecting an input triggering signal at the conclusion of said holdoff signal, and establishing a triggerable condition for said triggerable device in response to such detection;
    delaying the same input triggering signal for a predetermined time interval substantially independent of input signal waveform; and
    triggering operation of said triggerable device in response to said triggering signal as delay.

2. The method according to claim 1 further including shaping said triggering input signal before detection and delay thereof.

3. The method according to claim 1 wherein the input-triggering signal is delayed for said predetermined time interval with said interval being longer than the period required for said triggerable condition to be stabilized.

4. A jitter-free circuit for triggering a ramp generator comprising:
    means for providing a holdoff signal;
    means for detecting an input-triggering signal at the conclusion of said holdoff signal;
    means for initiating operation of said ramp generator, wherein a triggerable condition for said last mentioned means is established in response to said detection;
    delay means for also receiving said input-triggering signal and for delaying the same, said delay means comprising means having an input terminal and an output terminal and means for producing a substantially invariable delay therebetween, producing at the output terminal said input-triggering signal as delayed; and
    means for coupling the triggering signal as thus delayed to said means for initiating operation of said ramp generator, wherein said triggering signal as delayed is employed after said triggerable condition is established to initiate operation of said ramp generator.

5. The circuit according to claim 4 wherein said delay means comprises means for providing a delay longer than the period required for said triggerable condition to be stabilized.

6. The circuit according to claim 4 wherein said means for detecting an input-triggering signal comprises a first bistable device, with said means for initiating operation of said ramp generator comprising a second bistable device:
    wherein an input-triggering signal is effective to trigger said first bistable device from a first state to a second state at the conclusion of said holdoff signal; and
    wherein said second bistable device is responsive to said input-triggering signal as delayed for initiating a ramp output from said ramp generator after said first bistable device arms said second bistable device to said triggerable condition which corresponds to a given state of said second bistable device.

7. The circuit according to claim 6 wherein said bistable devices comprise tunnel diodes.

8. The circuit according to claim 4 further including means for shaping said input-triggering signal for application thereof to said means for detecting an input-triggering signal and to said delay means.

9. A jitter-free triggering circuit comprising:
a first bistable shaping circuit for receiving an input-triggering signal and providing a shaped triggering signal output in response thereto;
a second bistable circuit for receiving the output of said first bistable shaping circuit, when said second bistable circuit is in a responsive condition, for providing an enabling output corresponding to a second stable state of said second bistable circuit;
a third bistable circuit for receiving the enabling output of said second bistable circuit wherein said enabling output establishes a triggerable condition for said third bistable circuit;
and delay means responsive to the output of said first bistable shaping circuit for providing a delayed triggering input to said third bistable circuit to switch said third bistable circuit from a first stable state to a second stable state as the triggering output of said delay means exceeds a triggering level for said third bistable circuit; and
said third bistable circuit when switched providing an output from said triggering circuit.

10. The circuit according to claim 9 including means for establishing a responsive condition for said second bistable circuit at a predetermined time relative to the occurrence of an output from said triggering circuit.

11. The circuit according to claim 10 wherein said means for establishing a responsive condition comprises a multivibrator.

12. A jitter-free triggering circuit comprising:
means for providing an input-triggering signal;
means for providing a holdoff signal;
a first tunnel diode armed at the conclusion of said holdoff signal and triggerable by said input-triggering signal to a high voltage state after having been armed;
a second tunnel diode coupled to provide an output from said triggering circuit;
amplifier means for coupling said first tunnel diode to said second tunnel diode so that triggering of said first tunnel diode to its high voltage state arms said second tunnel diode;
and delay means receiving the input-triggering signal and for coupling a delayed triggering signal to said second tunnel diode; and
said second tunnel diode when armed being triggerable by the delayed triggering signal from said delay means to its high voltage state for providing a triggering circuit output.

13. The circuit according to claim 12 wherein said means for providing a holdoff signal is coupled to said first tunnel diode, and to said second tunnel diode through said amplifier means, to maintain both tunnel diodes in an unarmed condition for the duration of the holdoff period.